United States Patent [19]
Wolter

[11] Patent Number: 5,291,359
[45] Date of Patent: Mar. 1, 1994

[54] HEAD SUSPENSION ASSEMBLY INCLUDING A FLEXURE HAVING RAILS ARRANGED FOR INTERFACING WITH A HEAD RAMP

[75] Inventor: Raymond R. Wolter, Hutchinson, Minn.

[73] Assignee: Hutchinson Technology Incorporated, Hutchinson, Minn.

[21] Appl. No.: 693,858

[22] Filed: Apr. 29, 1991

[51] Int. Cl.⁵ .............. G11B 5/48; G11B 21/16; G11B 5/54; G11B 21/22
[52] U.S. Cl. ................................. 360/104; 360/105
[58] Field of Search ............... 360/103, 104, 105, 106

[56] References Cited

U.S. PATENT DOCUMENTS

| | | | |
|---|---|---|---|
| 3,931,641 | 1/1976 | Watrous | 360/104 |
| 4,167,765 | 9/1979 | Watrous | 360/103 |
| 4,663,682 | 5/1987 | McNeil | 360/105 |
| 4,796,122 | 1/1989 | Levy et al. | 360/98.01 |
| 4,819,094 | 4/1989 | Oberg | 360/104 |
| 4,853,812 | 8/1989 | Daito et al. | 360/104 |
| 4,875,117 | 10/1989 | Slezak et al. | 360/98.01 |
| 4,875,121 | 10/1989 | Tanaka et al. | 360/129 |
| 4,891,721 | 1/1990 | Ohashi et al. | 360/103 |
| 4,894,740 | 1/1990 | Chhabra et al. | 360/103 |
| 4,896,233 | 1/1990 | Yamada | 360/104 |
| 4,961,121 | 10/1990 | Astheimer et al. | 360/103 |
| 4,979,063 | 12/1990 | Ghose et al. | 360/106 |
| 4,992,898 | 2/1991 | Wanlass | 360/104 |
| 5,027,241 | 6/1991 | Hatch et al. | 360/105 |
| 5,034,837 | 7/1991 | Schmitz | 360/105 |
| 5,063,464 | 11/1991 | Astheimer et al. | 360/104 |
| 5,107,383 | 4/1992 | Takeuchi et al. | 360/104 |

FOREIGN PATENT DOCUMENTS

| | | | |
|---|---|---|---|
| 60-167172 | 8/1985 | Japan | 360/104 |
| 1-62876 | 3/1989 | Japan | 360/104 |

*Primary Examiner*—John H. Wolff
*Assistant Examiner*—Craig A. Renner
*Attorney, Agent, or Firm*—Faegre & Benson

[57] ABSTRACT

An improved head suspension assembly employs a wider and stiffer load beam and flexure having univeral lateral stiffness and a higher natural frequency. The flexure is a unitary configuration having a pair of rails positioned along opposite sides of the flexure. These rails are produced by bending a portion of the flexure material into a bend to form a projecting member arranged to project toward a surface of the load beam to which the flexure is mounted. In this way, the bend faces away from the load beam for interfacing with a ramp to move a head mounted to the flexure away from a disk. This configuration prevents flexure etched edge contact with the ramp and subsequently chipping or other damage to the head suspension assembly.

3 Claims, 6 Drawing Sheets

HEAD SUSPENSION ASSEMBLY INCLUDING A FLEXURE HAVING RAILS ARRANGED FOR INTERFACING WITH A HEAD RAMP

BACKGROUND OF THE INVENTION

1. Field of the Invention

The present invention relates generally to an improved magnetic head suspension assembly (HSA). The HSA is a component within a disk drive which positions a magnetic read/write head over the desired position on the storage media where information is to be retrieved or transferred. More specifically, the invention relates to a load beam and flexure assembly having increased lateral stiffness and a higher natural frequency than prior art assemblies.

2. Description of the Prior Art

With the advent of more powerful computers and the rapid growth in the personal computer market it has become increasingly more important to enable a user to access data from storage devices with increased speed and accuracy.

Because there is a need to reduce access times to enable rapid retrieval of data, it has become increasingly more important to reduce undesirable levels of vibration of components within the rigid disk drive. Vibration of drive components can cause instability of the drive's servo system. It also may delay the transfer of data because the data can not be confidently transferred until the amplitude of the vibration has substantially decayed. The current invention solves this problem by substantially increasing the natural frequency of vibration of the HSA and by increasing its lateral stiffness.

In terms of the dynamic characteristics of head suspension assemblies, higher vibration amplitudes or gains are more acceptable at higher frequencies. Lower spring rates yield better gram stability through stack up tolerances of drive actuator assemblies. A lower assembly and flexure pitch and roll stiffness help maintain assembly compliance. Increases in flexure lateral stiffness decrease unwanted assembly compliance.

SUMMARY OF THE INVENTION

It is therefore the major object of this invention to provide a head suspension assembly with enhanced performance in lateral stiffness.

More specifically, the suspension assembly of the present invention includes a spring load beam element portion joined to the arm at a proximal end thereof for supporting a magnetic head at a fixed distance from a rigid arm, where the flexure comprises a unitary flexure portion mounted on the load beam element at the distal end thereof and projecting beyond the distal apex of the element and where the flexure portion has a width $W_f$, wherein the flexure is divided into a central head mounting support means for receiving a disk drive head to be bonded thereto, a plurality of slots in the surface of the flexure portion to define at least two extended flexible arms for suspending the head support means from the distal end thereof for gimballed movement relative to the load beam element, and wherein the flexible arm portions at the end thereof distal to the load beam have a width $W_a$, the ratio of $W_a/W_f$ falling within the range of about 0.2 to 0.4, thereby increasing the lateral stiffness and the natural frequency of the flexure.

The invention may also include a magnetic head suspension for attachment to a rigid arm, where the head suspension includes a spring load beam element portion joined to the arm at a proximal end thereof, a unitary flexure portion mounted on the load beam element at the distal end thereof and projecting beyond the distal apex of the element and wherein the flexure portion has a width $W_f$ and wherein the flexure includes a central head mounting support means for receiving a disk drive head to be bonded thereto and a plurality of slots in the surface of the flexure portion to define at least two extended flexible arms for suspending the support means from the distal end thereof for gimballed movement relative to the load beam element; the flexible arm portions at the end thereof distal to the load beam having a width $W_a$, the ratio of $W_a/W_f$ falling within the range of about 0.2 to 0.4, thereby increasing the lateral stiffness and the natural frequency of the flexure.

These and other objects of the present invention will be apparent with reference to the drawings, the description of the preferred embodiment, and the claims.

DETAILED DESCRIPTION OF THE DRAWINGS

Figure 1:
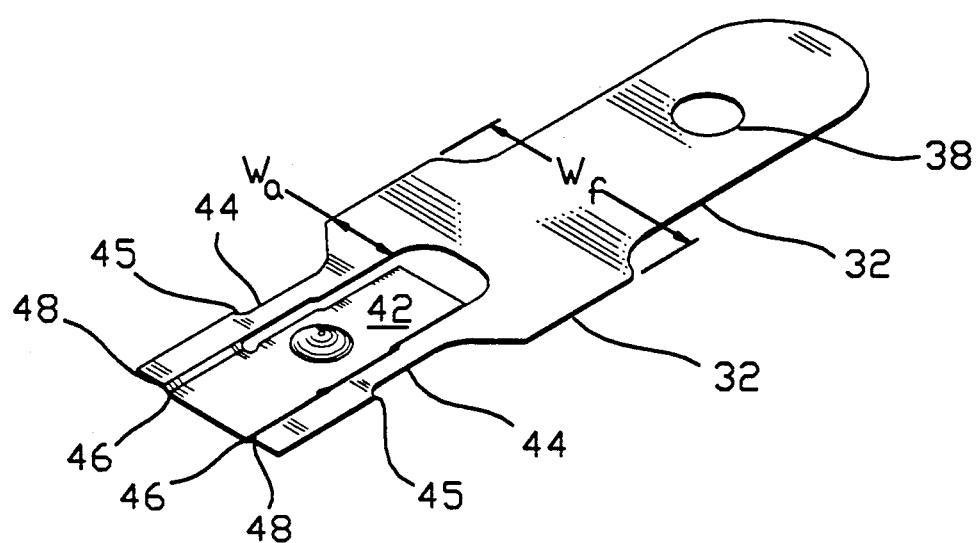
FIG. 1 is a perspective view of a flexure in accordance with the present invention.
Figure 2:
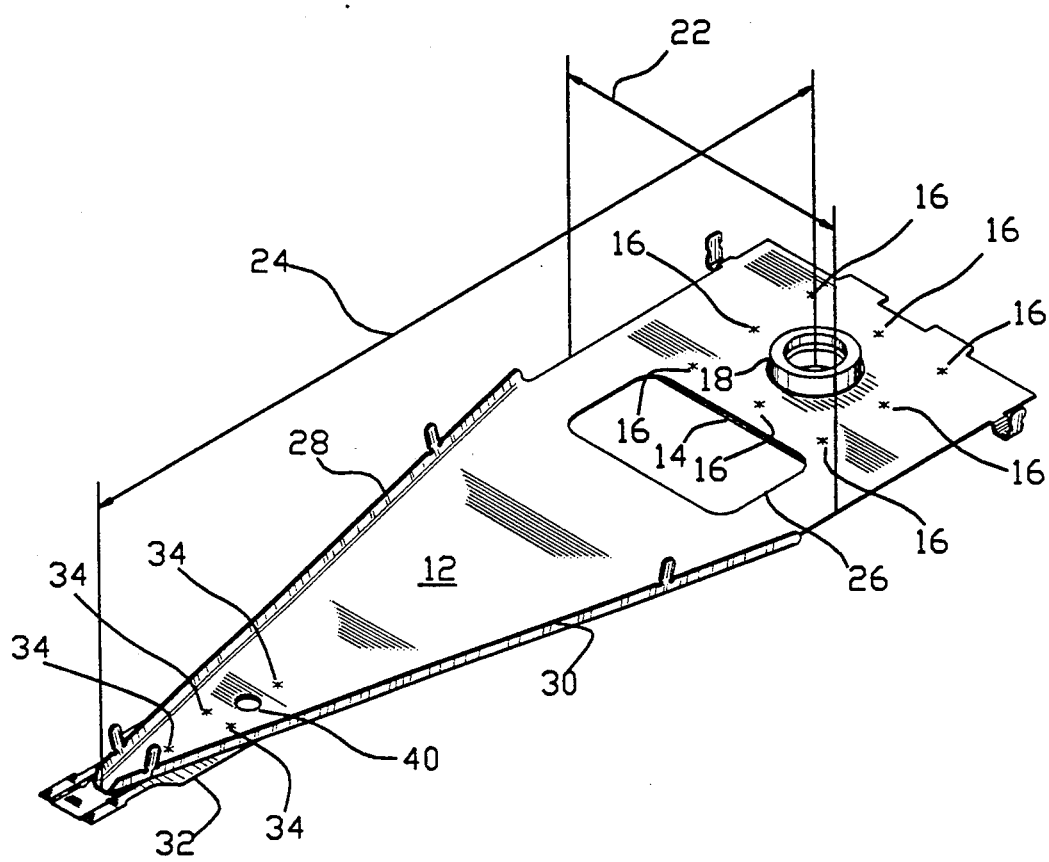
FIG. 2 is a perspective view of a head support assembly utilizing the flexure of FIG. 1 in accordance with the present invention.

FIG. 1 and 2 show an embodiment of the flexure means of the present invention. In FIG. 2, a spring load beam element 12 is shown. At the proximal end of load beam element 12 are means for joining the load beam to the rigid arm in the disk drive. For example, in FIG. 2 a base plate 14 is welded by a series of conventional welds 16 to the proximal end of load beam 12. Base plate 14 includes a swaging boss 18 which projects through the surface of load beam element 12 and is used to attach the load beam element to a rigid arm in the disk drive.

Reference line 22 illustrates the width of load beam element 12 at the proximal end of the load beam element and reference character 24 is used to designate the length measurement from the center line of the point of attachment to the rigid arm to the distal extremity of the load beam element. In the embodiment shown in FIG. 2 the length is taken from the distal tip of the load beam element to the center of swaging boss 18.

Although load beam elements constructed in accordance with the prior art may have the same general appearance as the load beam element shown in FIG. 2, load beam element 12 is substantially wider than comparable prior art units. Comparable prior art units have width to length ratios generally in the range of 0.2 and below. In the embodiment shown in FIG. 2, the width to length ratio exceeds 0.4.

In order to tune or adjust the spring characteristics of load beam element 12, an aperture 26 can be cut from a portion of the face of load beam element 12. Removal of the material in aperture 26 changes the spring rate stiffness of the suspension in the region between base plate 14 and the stiffened portion of the load beam element between side rails 28 and 30. In this manner, the spring rate of the suspension can be made, if desired, to be comparable with that of the prior art devices despite the stiffness otherwise contributed by the increased relative width of the suspension.

In the embodiment shown, flexure 32 is welded to load beam element portion 12 by a series of welds 34. A tooling hole 38 in the surface of flexure 32 is aligned with a similar tooling hole 40 in spring load beam element 12 to assist in assembly of the flexure and load beam element and in the later assembly of the disk drive.

In accordance with the present invention, flexure portion 32 includes a central head mounting support means 42 to which a disk drive head is to be bonded. The width $W_f$ of flexure 32 measured at its widest point is selected to be substantially wider than the prior art flexures in order to increase the lateral stiffness and the natural frequency of the flexure. As shown in FIG. 1, central head mounting support 42 is depressed from the remainder of the body of the flexure by form lines 46 and 48.

A pair of arms 44 connects, at the extreme distal end of flexure 32, central head mounting support means 42 to the distal ends of arms 44. The proximal width $W_a$ of the arms 44 is substantially wider than the distal end of the arms and the ratio of the distal arm width to the width of the proximal end of the arms can be between 0.2 and 0.8.

In the prior art, similar flexure arms do not have a proximal increase in the width of the arms and the arms are relatively narrower, having a ratio of width $W_a/W_f$ of about 0.19. In the preferred embodiment shown, the width $W_f$ of the flexure is substantially greater, and the width of the arm $W_a$ is increased so that the ratio $W_a/W_f$ is in the range of 0.2 through 0.4.

As can also be seen in FIG. 1, the inside and outside facing edges of the arms 44 are notched with a notch 45 to reduce the width of the arm 44 from a fixed maximum width to a minimum width between the midpoint and the proximal end of arm 44 to lower the pitch and roll flexure stiffness. The ratio of the thinnest portion of the arm to the widest is at least about 0.2 to 0.8.

Figure 3:
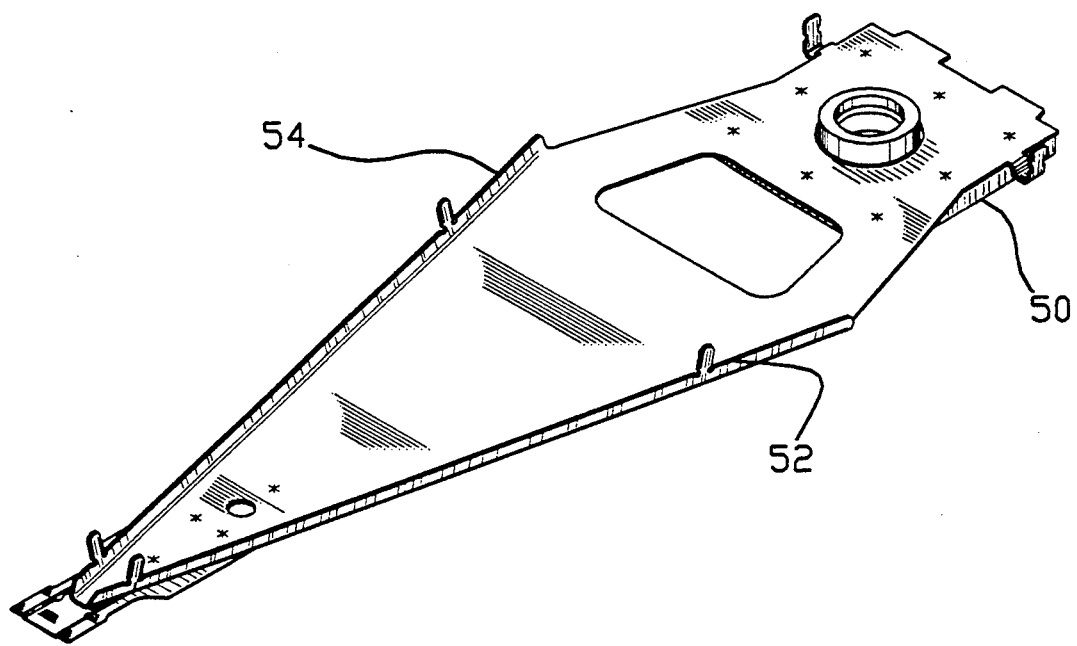
FIG. 3 is a perspective view of another embodiment of the present invention.

FIG. 3 shows a different embodiment of the present invention. The portion of the load beam at the proximal end has a substantially reduced width so that the load beam element flares outwardly from the distal end and mounting plate 50 to a maximum width at the proximal end of side rails 52 and 54.

Figure 4:
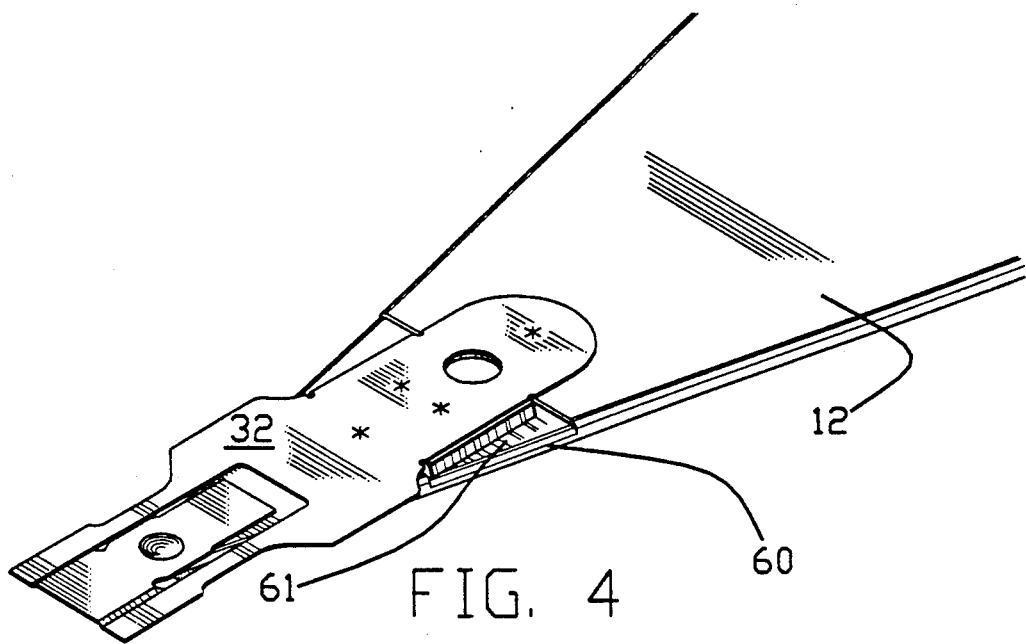
FIG. 4 is a perspective view showing a perspective view of a further embodiment of the flexure mounted at the distal end of a load beam.
Figure 5:
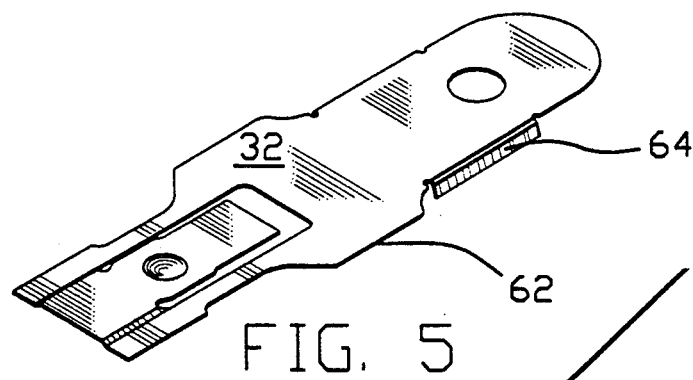
FIG. 5 is a perspective view of the flexure shown in FIG. 4.

FIG. 4 shows an alternative embodiment of a load beam where the distal end of load beam 12 has its distal apex portion 60 relieved by a further embossing step to form rail means receiving indentations 61 thereby permitting the surface of the flexure means 32 to be flushly aligned with the surface of the load beam element 12 with the rail means 64 projecting into the rail means receiving indentations 61. Flexure 62 has stiffening side rails 64 positioned along its side edges to prevent the ramp used in a head lifter of the disk drive from contacting the etched edge of the flexure.

Figure 6:
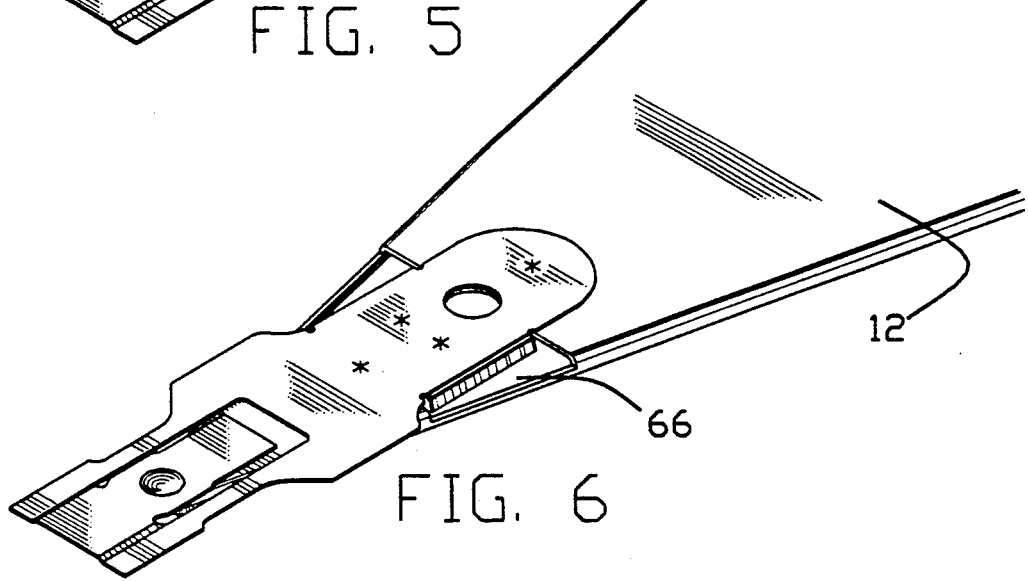
FIG. 6 is a perspective view of a further embodiment showing a flexure mounted at the distal end of a load beam.

FIG. 6 shows a slightly different form of modified load beam 12 where rail means receiving apertures 66 are cut in the distal apex portion of the load beam to accomodate side rails 64 of flexure 62 and to permit rails 64 to project through the rail means receiving apertures.

Figure 7:
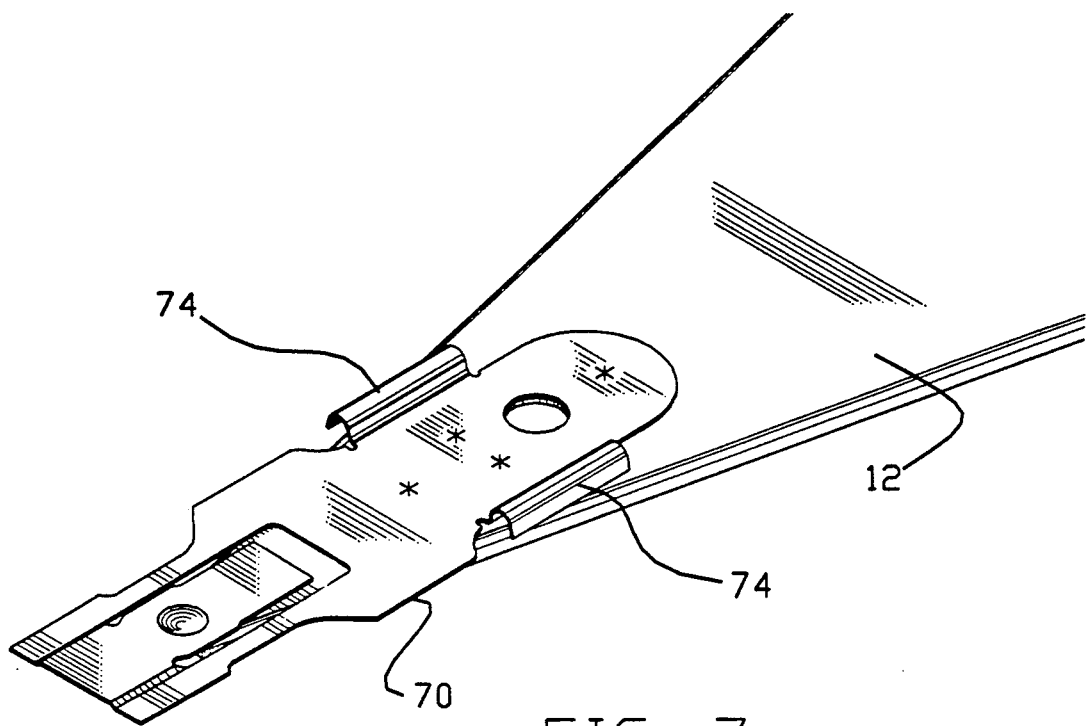
FIG. 7 is yet another embodiment of the invention with the flexure mounted at the distal end of a load beam.
Figure 8:
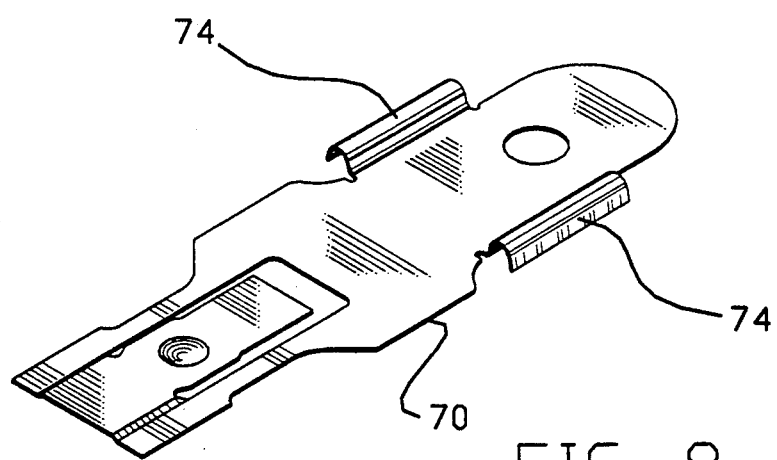
FIG. 8 is a perspective view of the flexure shown in FIG. 7.

FIGS. 7 and 8 show a flexure 70 welded to load modified by forming or cutting as were the load beams shown in FIG. 4 and 6. Side rails 74 prevent the ramp used in the head lifter of the disk drive from contacting the etched edge of the flexure.

The flexure shown in FIGS. 7 and 8 can be utilized without the necessity of modifying the load beam as was the case in FIG. 4 or 6.

Figure 9:
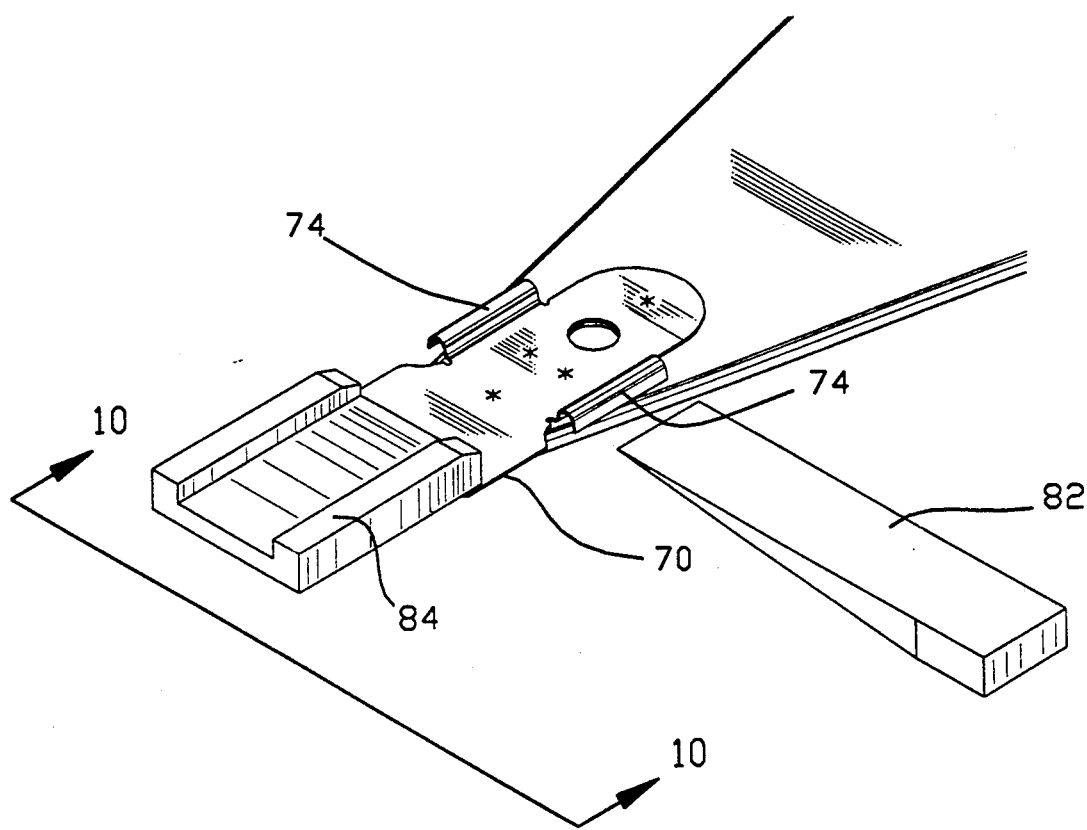
FIG. 9 is a perspective view of a flexure and load beam assembly of FIG. 7 illustrating the position of a ramp.
Figure 10:
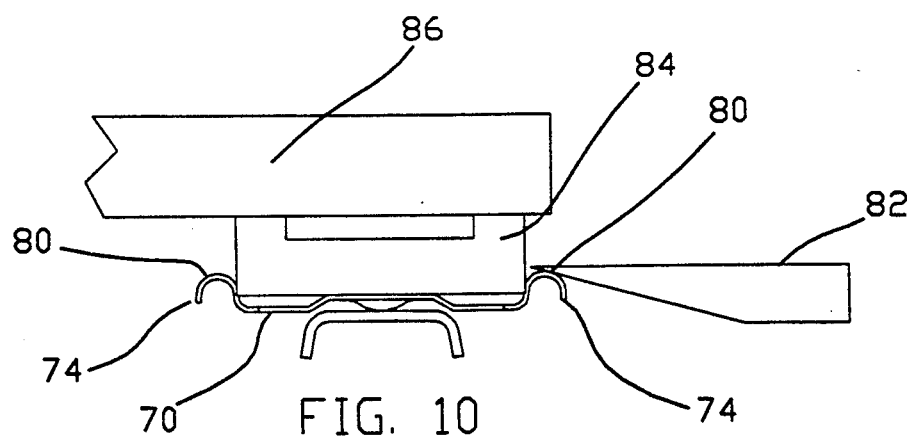
FIG. 10 is a profile view of FIG. 9 taken along the line 10—10, and additionally showing the position of a ramp contacting a flexure rail.

As illustrated in FIGS. 9 and 10, the well-radiused bend 80 of the side rails 74 of the flexure 70 (as shown in FIGS. 7 and 8) prevents the ramp 82 used in the head lifter of the disk drive from contacting the etched edge of the flexure 70 in moving the head 84 away from the surface of the disk 86.

Further, the embodiments described above are by no means limited, and various changes and modifications are possible without departing from the scope and spirit of the invention.

What is claimed is:

1. A magnetic head suspension including a spring load beam element portion joined to a distal end of a rigid arm for supporting a magnetic head at a fixed distance from the rigid arm;
   a unitary flexure portion mounted on the load beam element portion at a distal end of the load beam element portion and projecting beyond a distal apex of the load beam element, the flexure portion being divided into
   a central head mounting support means for receiving the magnetic head to be bonded thereto;
   a plurality of slots in a surface of the flexure portion to define at least two extended flexible arms for suspending the support means from a distal end of the flexure portion for gimballed movement of the magnetic head relative to the load beam element portion, rail means comprising at least a pair of unitary rails positioned along opposite sides of the flexure portion, each of said rails produced by bending a portion of flexure material into a well-radiused bend to form a projecting member constructed and arranged such that the projecting member projects toward a surface of the load beam element portion to which the flexure portion is attached and such that the well-radiused bend is positioned for interfacing with a ramp in a disk drive to move the magnetic head away form a surface of a disk when the ramp engages the rail means.

2. A magnetic head suspension for attachment to a rigid arm, said head suspension comprising, in combination:
   (a) a unitary flexure portion divided into a central head mounting support means for receiving a magnetic head to be bonded thereto;

a plurality of slots in a surface of the flexure portion to define at least two extended flexible arms for suspending the support means from a distal end of the flexure portion for gimballed movement of the magnetic head relative to a load beam element portion, rail means comprising at least a pair of unitary rails positioned along opposite sides of the flexure portion, each of said rails produced by bending a portion of flexure material into a bend to form a projecting member constructed and arranged such that the projecting member projects toward a surface of the load beam element portion to which the flexure portion is attached and such that the bend is positioned for interfacing with a ramp in a disk drive to move the magnetic head away from a surface of a disk when the ramp engages the rail means; and (b) the load beam element portion joined to the rigid arm at a distal end of the rigid arm, the load beam element portion having a portion of its distal surface removed to form projecting member receiving apertures thereby permitting the surface of the flexure portion to be flushly aligned with the surface of the load beam element portion with the projecting members of the rail means projecting through the projecting member receiving apertures, said flexure portion mounted on the load beam element portion at a distal end of the load beam element portion and projecting beyond a distal apex of the load beam element portion.

3. A magnetic head suspension for attachment to a rigid arm, said head suspension comprising, in combination:

(a) a unitary flexure portion divided into a central head mounting support means for receiving a magnetic head to be bonded thereto;

a plurality of slots in a surface of the flexure portion to define at least two extended flexible arms for suspending the support means from a distal end of the flexure portion for gimballed movement of the magnetic head relative to a load beam element portion, rail means comprising at least a pair of unitary rails positioned along opposite sides of the flexure portion, each of said rails produced by bending a portion of flexure material into a bend to form a projecting member constructed and arranged such that the projecting member projects toward a surface of the load beam element portion to which the flexure portion is attached and such that the bend is positioned for interfacing with a ramp in a disk drive to move the magnetic head away from a surface of a disk when the ramp engages the rail means; and (b) the load beam element joined to the rigid arm at a distal end of the rigid arm, the load beam element portion having a portion of its distal surface embossed to form projecting member receiving indentations, thereby permitting the surface of the flexure portion to be flushly aligned with the surface of the load beam element portion with the projecting members of the rail means projecting into the projecting member receiving indentations, said flexure portion mounted on the load beam element portion at a distal end of the load beam element portion and projecting beyond a distal apex of the load beam element portion.

* * * * *